March 18, 1958     K. L. KIRALY     2,826,975

UNIVERSAL RANGE FINDER ASSEMBLY

Filed May 10, 1954     5 Sheets-Sheet 1

INVENTOR.
KARL L. KIRALY

BY
Naylor and Lesseque
ATTORNEYS

March 18, 1958 K. L. KIRALY 2,826,975
UNIVERSAL RANGE FINDER ASSEMBLY
Filed May 10, 1954 5 Sheets-Sheet 2

INVENTOR.
KARL L KIRALY
BY Naylor and Lanagne
ATTORNEYS

March 18, 1958　　　K. L. KIRALY　　　2,826,975
UNIVERSAL RANGE FINDER ASSEMBLY
Filed May 10, 1954　　　　　　5 Sheets-Sheet 3

INVENTOR.
KARL L. KIRALY
BY
ATTORNEYS

March 18, 1958  K. L. KIRALY  2,826,975
UNIVERSAL RANGE FINDER ASSEMBLY
Filed May 10, 1954  5 Sheets-Sheet 4
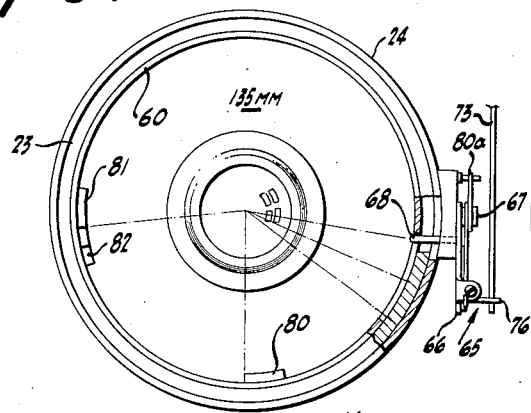
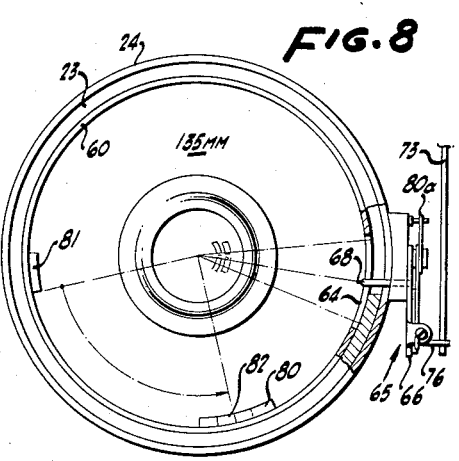
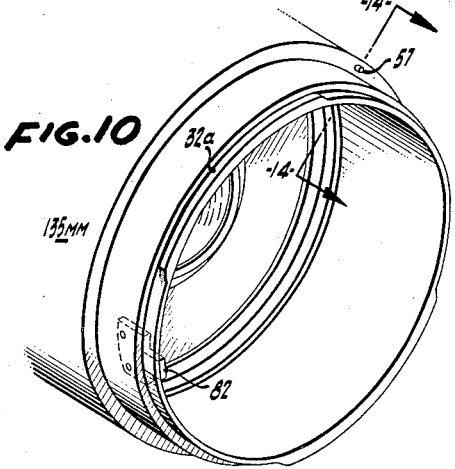
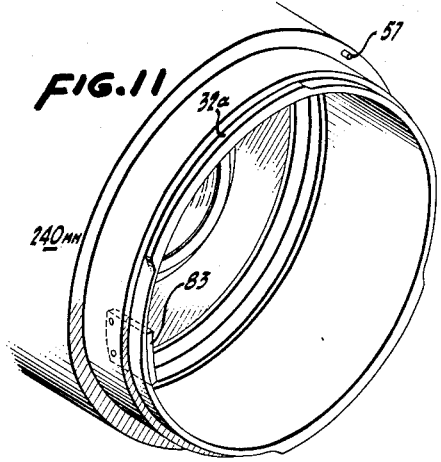
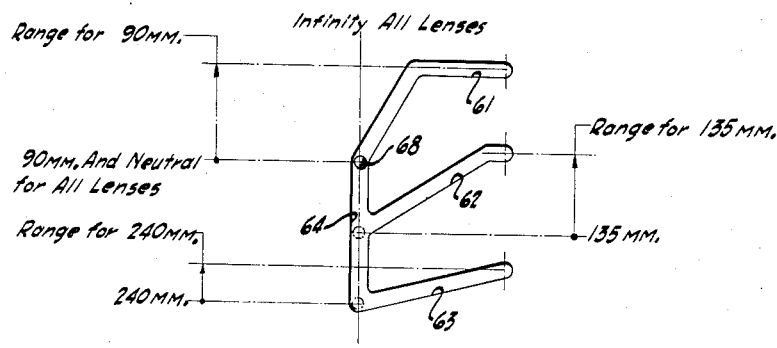
INVENTOR.
KARL L. KIRALY
BY *Naylor and Lassagne*
ATTORNEYS March 18, 1958        K. L. KIRALY        2,826,975

UNIVERSAL RANGE FINDER ASSEMBLY

Filed May 10, 1954        5 Sheets-Sheet 5

INVENTOR.
KARL L. KIRALY
BY
*Naylor and Lassagne*
ATTORNEYS

United States Patent Office 2,826,975
Patented Mar. 18, 1958

2,826,975

UNIVERSAL RANGE FINDER ASSEMBLY

Karl Lajos Kiraly, San Jose, Calif., assignor to Roy A. Brown, San Rafael, Calif., and Warren R. Roll, Belvedere, Calif.

Application May 10, 1954, Serial No. 428,712

7 Claims. (Cl. 95—44)

This invention relates to photography and more particularly to certain new and useful improvements in photographic cameras adapted to employ interchangeable lenses differing in focal length and provided with a range finder having a movable optical element which is universally coupled to the focusing mechanism so that the movable optical element will be properly moved during focusing of the interchangeable lenses when individually employed with the camera.

There are many cameras adapted to employ lenses of different focal lengths to permit the exchange of one lens for another, depending on the nature and distance of the object being photographed. In such cameras, however, it is difficult to provide a range finder which will be properly coupled in relation to each of the several lenses since an optical range finder correlated to cooperate properly with a lens having a given focal length will not operate correctly when employed with a lens having a different focal length. In order to provide for the proper adjustment of the range finder corresponding to each of the focal lengths of the several lenses to be employed, it has heretofore been proposed to provide a variable coupling means wherein a cam member corresponding to the focal length of the lens employed is adapted to engage a lever connected to the movable optical element of the range finder to adjust the same when the lens is focused. In the various embodiments of such construction, the cam member was either a part of the lens mount, being integral therewith or attached thereto in any suitable manner, or was a resilient variable cam carried by the camera adapted to be engaged by protruberances on the inner ends of the individual lens mounts and adjusted thereby to the proper pitch corresponding to the lens being used.

A principal object of the present invention is to provide for such cameras a universal range finder coupling of improved type wherein the cam member comprises a plurality of motion-correcting cam slots which are carried by a rotatable control sleeve mounted within the camera and adapted for movement with the individual lenses during focusing thereof. In accordance with this object, the cam slots are adapted to be selectively engaged by a motion-transmitting coupling means connected to the movable optical element of the range finder such that the latter will be properly moved during focusing of each of the interchangeable lenses when individually employed with the camera.

Another object of the present invention is to provide a universal range finder coupling of the type described above wherein the motion-correcting cam slots are individually formed in the rotatable control sleeve in strict accordance with the focal lengths of each of the individual lenses to be employed by the camera.

A further object of the invention is to provide a universal range finder coupling of the above type wherein the rotatable control sleeve is adapted to be automatically positioned when the lens mounts are individually employed with the camera to selectively engage the motion-transmitting coupling means in the cam slot formed in the control sleeve corresponding to the focal length of the lens carried by the individual mount being employed.

Yet another object of the present invention is to provide a universal range finder coupling of the type described which is particularly adapted for use in a camera equipped with a focusing assembly for interchangeable lenses of the type described in the pending application for patent Serial Number 390,460, filed November 6, 1953, now abandoned.

Other objects and advantages of the present invention will be in part obvious from the accompanying drawings and in part hereinafter pointed out in connection with the description thereof with particular reference being made to the novel features of construction, combination of parts, and unique relation of the various members and the relative proportioning and disposition thereof.

To enable others skilled in the art to fully understand the present invention, a preferred embodiment of the invention is illustrated in the accompanying drawings in combination with a camera of the type disclosed in the aforementioned pending application Serial Number 390,460, filed November 6, 1953, adapted to employ interchangeable lenses of 90, 135 and 240 mm. focal lengths, respectively: in which drawings Figure 1 is a front view in elevation, partly in section, of the camera with a 90 mm. lens mount inserted therein, and showing a portion of the universal range finder coupler according to the invention;

Figure 7 is an end view, partly in section, taken along line 7—7 of Figure 5;

Figure 8 is an end view, partly in section, taken along line 8—8 of Figure 6;

Figure 1:
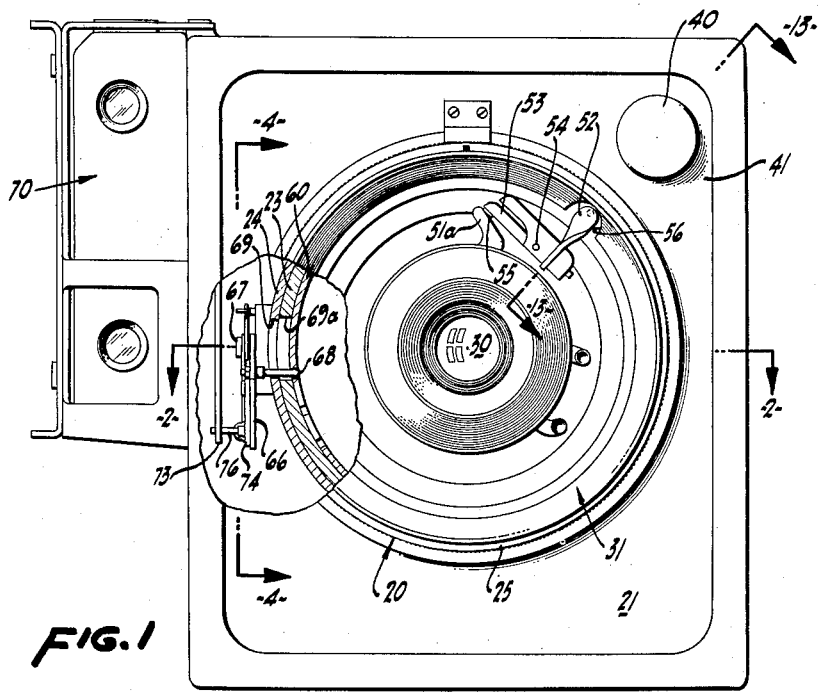
Figure 13:
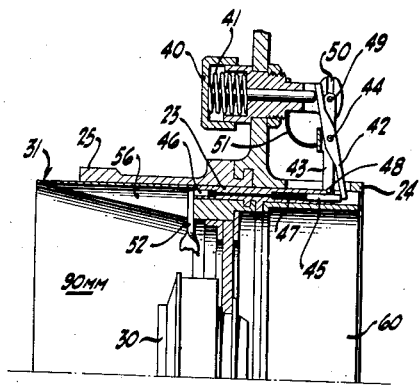

Figures 10 and 11 are perspective views of the rear end portions of the 135 mm. and 240 mm. lens mounts, respectively;

Figure 12 is a diagrammatic view of the cam slots;

Figure 13 is a sectional view taken along line 13—13 of Figure 1; and

Figure 14:
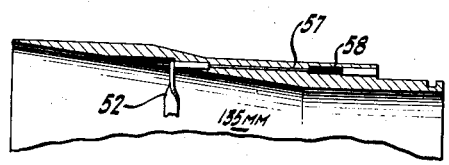

Figure 14 is a sectional view taken along line 14—14 of Figure 10.

Referring now to the drawings, wherein like reference numerals denote like parts throughout, and in particular to Figures 1 through 3, 20 indicates generally a focusing assembly which is carried by the front plate 21 secured to the usual camera body or housing 22. The structure and operation of the focusing assembly 20 shown in detail in these figures is substantially the same as that disclosed in the aforementioned pending application Serial Number 390,460, filed November 6, 1953, and it is pointed out that such assembly is shown by way of disclosure only for the purpose of illustrating a preferred construction with which the novel features according to the present invention are adapted to be employed.

Figure 2:
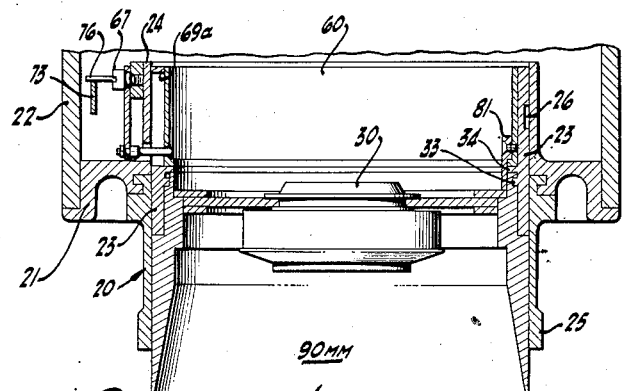
Figure 2 is a sectional view taken along line 2—2 of Figure 1.
Figure 3:
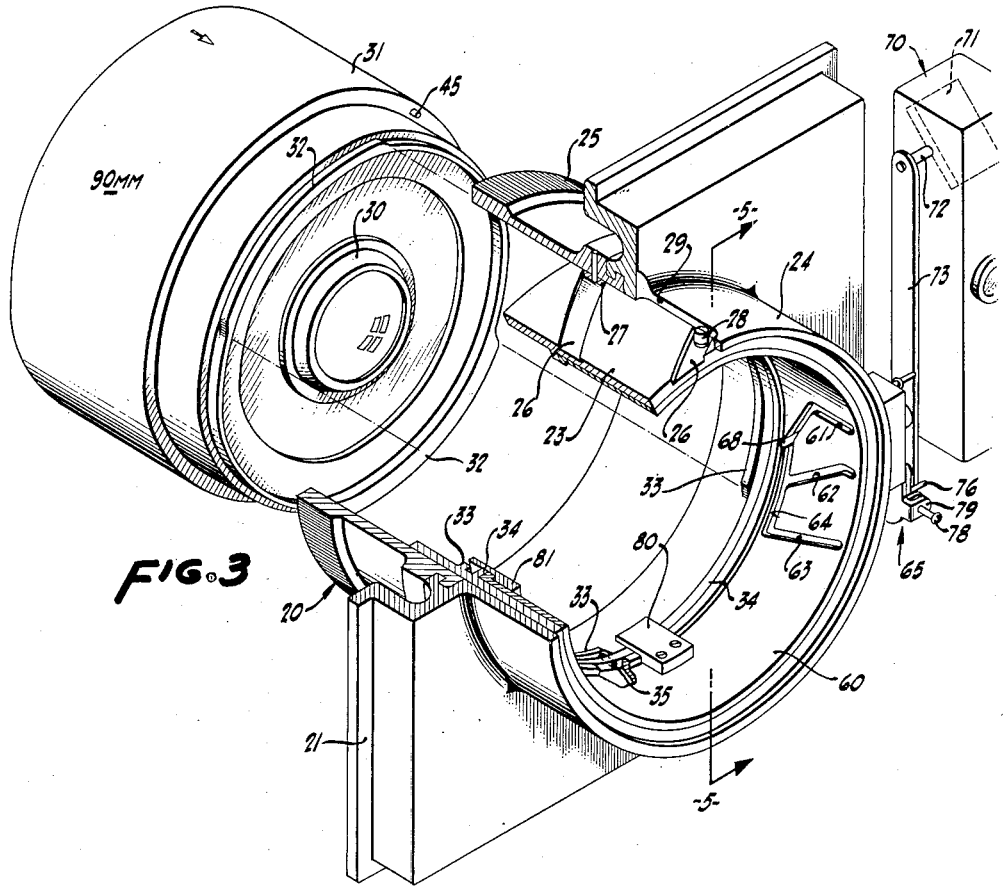
Figure 3 is a perspective view, partly in section, showing the focusing assembly and universal range finder coupler according to the invention, and showing the 90 mm. lens mount positioned for insertion in the focusing assembly.

As shown in detail in Figures 2 and 3 such focusing assembly comprises a tubular focusing member 23 which is carried within the coaxial bores of an inner guide sleeve 24 formed integral with the front plate 21 of the camera, and an outer focusing sleeve 25 carried by the fixed sleeve 24 and adapted for rotational adjustment with respect thereto. The tubular member 23 is provided with one or more external grooves 26 which extend around its outer circumference in the manner shown in Figure 3 and are engaged by one or more studs 27 secured within the bore of the focusing sleeve 25, and with a key 28 which is engaged in the longitudinally extending keyway 29 formed in the fixed sleeve 24. As will be apparent from such construction, angular adjustment of the rotatable sleeve 25 will cause a longitudinal but non-angular movement of the tubular member 23 within the coaxial bores of fixed and focusing sleeves through the action of the studs 27 in the helical grooves 26 and the key 28 in the keyway 29. In this respect, the helical grooves are preferably of such pitch that complete longitudinal movement of the tubular member 23 will be made within the limits provided by the movement of the key 28 in the keyway 29 through an angular adjustment of the focusing sleeve 25 of approximately 90 degrees.

The camera lens 30 or, as the case may be, an optical combination including in addition to the usual optical elements forming such lens of given focal length, iris and shutter mechanisms of well known type, is mounted in a barrel or lens mount, generally designated as 31. The outer circumference of the lens mount is stepped to permit the seating of the mount in the different bores of the focusing sleeve 25 and tubular member 23, such that the mount may when seated be removably secured in fixed relation to the tubular member 23 by means of the locking arrangement shown in detail in Figure 3. In this respect, the inner end of the lens mount is provided with oppositely disposed arcuate flanges 32 formed around its outer circumference which, upon entry of the mount in the tubular member 23, are adapted to slide between the forwardly disposed arcuate flange elements 33 and to engage the rearwardly disposed annular flange 34 formed in the inner circumference of the tubular member 23. To secure the lens mount to the tubular member, the mount is then rotated to position the arcuate flanges 32 between the arcuate flange elements 33 and the annular flange 34, see Figure 2. A pin or stop 35 is provided which is engaged by the end of one of the arcuate flanges 32 upon rotational movement of the mount of approximately 90 degrees to position said mount in fixed relation to the tubular member 23; and when the lens mount is rotated to disconnect it from the tubular member 23, to be engaged by the adjacent end of the other arcuate flange 32 to position the mount for removal.

For the purpose of actuating from the camera body the shutter mechanism of the optical combination when the lens mount is positioned and locked in the tubular member 23, there may be provided a shutter actuating or tripping mechanism, as for example of the type disclosed in the aforementioned pending application and shown in detail in Figures 1, 13 and 14. As shown, see Figure 13, when the member 40 is depressed by the operator against the urge of the spring 41, the lever 42 carried by the member 43 will be pivoted about the pin 44 to move the rod 45 in an outward longitudinal direction against the urge of the spring 47 such that its end 46 will project beyond the end of the tubular member 23. The member 43 is adapted to follow the tubular member 23 during longitudinal focusing movement thereof by means of the pin 48 which is engaged in a detent in the outer circumference of the tubular member 23, and the pin 49 which is slidable in a radial direction in the guide slot 50. A spring 51 serves to maintain the pin 48 in engagement with the receiving detent. By means of this arrangement, the lever 42 will at all times operatively engage the respective ends of the member 40 and rod 45 as the tubular member 23 moved in a longitudinal direction through adjustment of the focusing sleeve 25, since the member 43 will in relation to such movement be caused to pivot about the pin 49 which will at the same time be moved in a radial direction in the slot 50.

For actuating the usual trip lever 51a of the shutter mechanism, see Figure 1, a longitudinally extending L-shaped lever 52 is pivotally mounted on the front of the lens mount adapted, when the lens mount has been positioned in the tubular member 23 such that the end of arcuate flange 32 will engage the stop 35, to be pivoted in response to an outward projecting movement of the rod 45 to pivot the transversely extending lever 53 about the pin 54 such that the flange 55 on the end thereof will depress the shutter lever 51 in an inward radial direction to trip the shutter mechanism. In the construction shown in Figure 13, wherein the lens mount carries an optical combination having a lens of 90 mm. focal length, the end of the L-shaped lever 52 is positioned within the recess 56, which is formed in the wall of the lens mount extending in the manner shown to the stepped portion thereof forming the seat for the end of the tubular member 23, such that it will be engaged directly by the end 46 of the rod 45 when caused to project beyond the end of the tubular member 23 in the manner above described. Where optical combinations having lenses of longer focal lengths are to be employed, the lenses must be spaced proportionately farther from the focal plane of the camera and the arrangement shown in Figure 14 with respect to the lens mount for an optical combination having a lens of 135 mm. focal length is used. In this arrangement, the L-shaped lever 52 is actuated by a rod 57 slidably disposed in the wall of the lens mount and adapted, when the mount is positioned in the tubular member 23, to be moved in an outward longitudinal direction against the urge of a spring 58 when the rod 45 is caused to project beyond the end of the tubular member 23.

Figure 4:
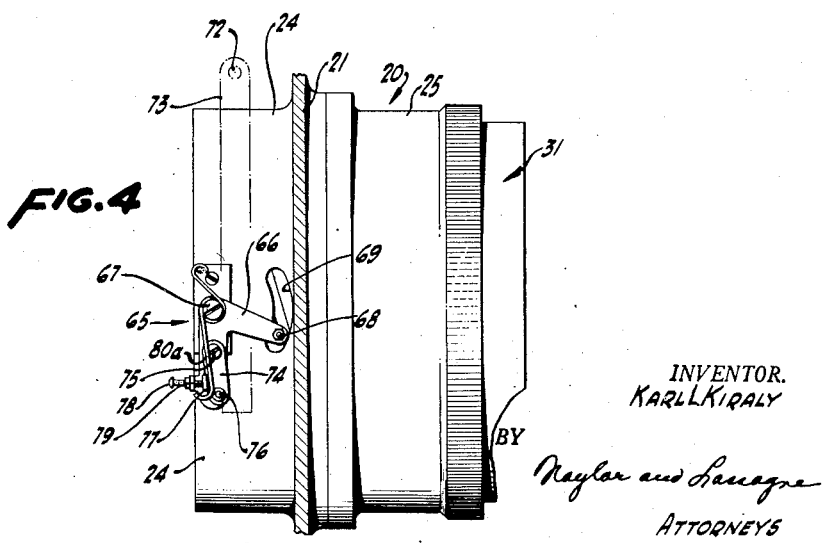
Figure 4 is a view taken along 4—4 of Figure 1 showing the motion-transmitting coupler.

Referring now to Figures 3 and 4, in accordance with the present invention a control sleeve 60 is rotatably mounted within the inner end of the tubular member 23 in a suitable manner as for example by means of a set screw which extends inwardly through the wall of tubular member and engages a circumferential slot formed in the outer circumference of the sleeve 60 (not shown). Spaced around the periphery of the control sleeve 60 are a plurality of cam slots, here illustrated as three in number corresponding to the three optical combinations to be employed and designated as 61, 62 and 63, respectively. The outer ends of these cam slots are connected by means of a circumferential slot 64 which may be defined as a neutral or positioning slot. Each cam slot is formed in the control sleeve in accordance with the focal length of one of the lenses such that longitudinal focusing movement of the tubular member 23 may be adjusted to transmit, in the manner to be described hereinafter, movement to the movable member of the range finder in strict accordance with the optical combination being employed.

Mounted on the outside of the fixed sleeve 24 is motion-transmitting coupler, generally designated as 65, see Figure 4, comprising a bell crank 66 which is pivotally secured to said sleeve adjacent its inner end by means of a screw 67. At the end of the forwardly extending arm of the bell crank 66 is a pin 68 which extends radially inwardly through a forwardly disposed arcuate slot 69 formed in the wall of the fixed sleeve 24 and a longitudinally extending window 69a formed in the tubular member 23, and is engaged in one of the slots formed in the control sleeve 60.

For the purpose of illustrating the manner in which the cam slots adjust longitudinal focusing movement of the tubular member 23 to effect by means of the bell crank 66 a corrected movement of the movable range finder member, the range finder generally designated at 70 is illustrated as carried by the side of the camera casing 22 in the usual well known manner. The range finder 70 may be of any of the well known light deflecting types in which a mirror or prism is tiltably mounted so as to serve as a beam or light deviating means for the purpose of deflecting one of the two range finder beams, and bringing the range finder into coincidence. The movable light deflecting member 71 is carried by a shaft 72 which is pivotally mounted to extend within the camera housing 22 and the inner end of the shaft 72 is secured to a lever 73 which extends in a downward direction to engage in a suitable manner the downwardly extending arm of the bell crank 66. The lever 73 is held in engagement with the bell crank by suitable resilient means such as a tension spring (not shown).

To permit relative adjustment between the bell crank 66 and the lever 73, the bell crank carries a lever 74 which is pivotally mounted at one end to the downwardly extending arm by means of the screw 75. The other end of the lever 74 carries a pin 76 which is engaged by the lever 73, and a flange 77 which is engaged by a screw 78 carried by a flange 79 formed in the bell crank. The lever 74 is held in engagement with the screw 78 by means of the spring 80a, which spring also serves to urge the bell crank 66 in a clockwise direction (see Figure 4) such that the pin 68 will be normally positioned in the bottom portion of the arcuate slot 69.

In this arrangement, the tubular member 23 is positioned in its innermost position corresponding to an infinity setting of the focusing assembly, and it will be observed from Figure 3 that the control sleeve 60 is angularly positioned such that the pin 68 is engaged in the end of the neutral slot 64 adjacent the cam slot 61, which in the present case, is formed corresponding to the adjusted movement to be transmitted to the light deflecting member 71 for an optical combination having a 90 mm. focal length. Accordingly, when the lens mount shown in Figure 3 carrying such optical combination is inserted in the focusing assembly and locked to the tubular member 23, the pin 68 will upon outward longitudinal movement of said tubular member in focusing the lens be engaged in and moved by the cam slot 61 to pivot the bell crank 66 such that the lever 73 will be moved to adjust the light deflecting member 71 in strict accordance with the focal setting of the lens. By forming the cam slots 62 and 63 to correspond to the focal lengths of the other optical combinations illustrated for the purpose of disclosure as having lenses of 135 mm. and 240 mm. focal lengths respectively, the light deflecting member 71 of the range finder is adapted to be adjusted in accordance with each of the optical combinations to be employed.

Figure 5:
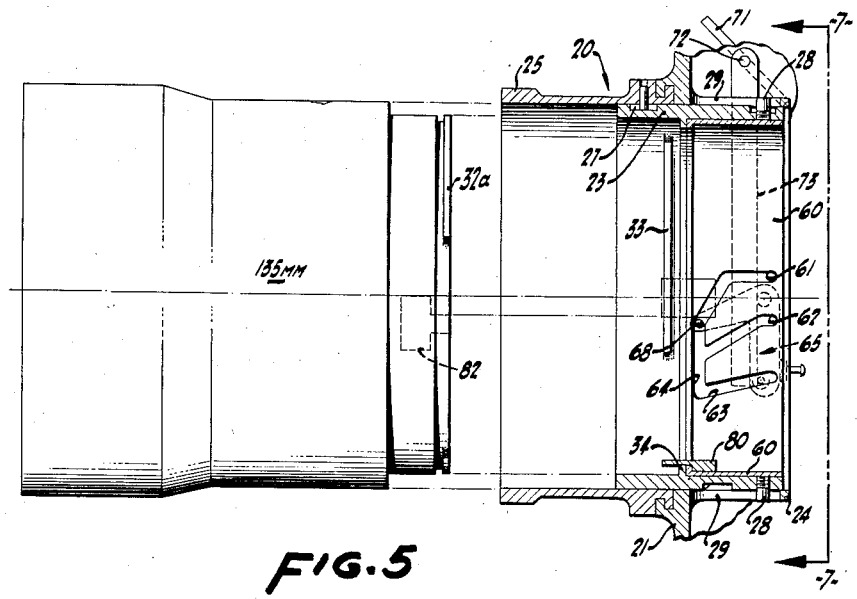
Figure 5 is a sectional view along line 5—5 of Figure 3 but showing a 135 mm. lens mount in place of the 90 mm. lens mount.
Figure 6:
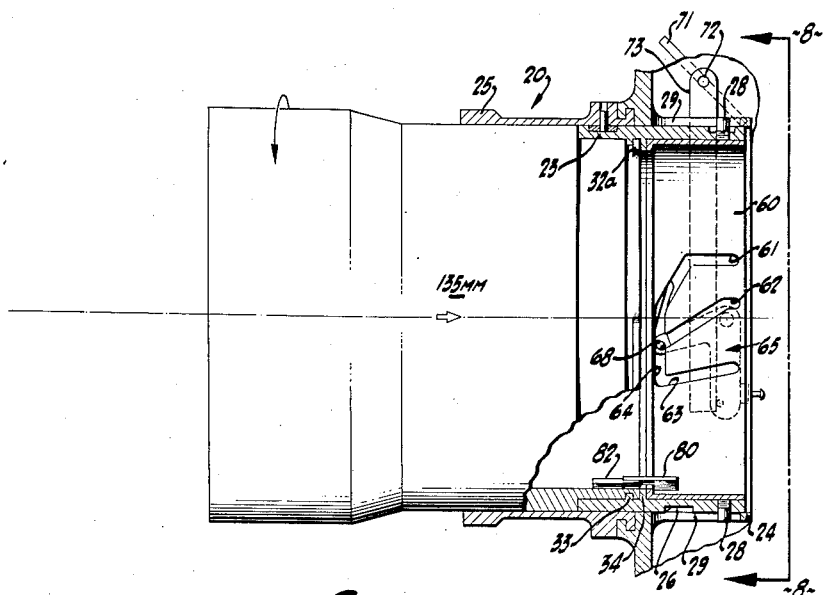
Figure 6 is the same as Figure 5 showing the 135 mm. lens mount inserted and locked in the focusing assembly.
Figure 9:
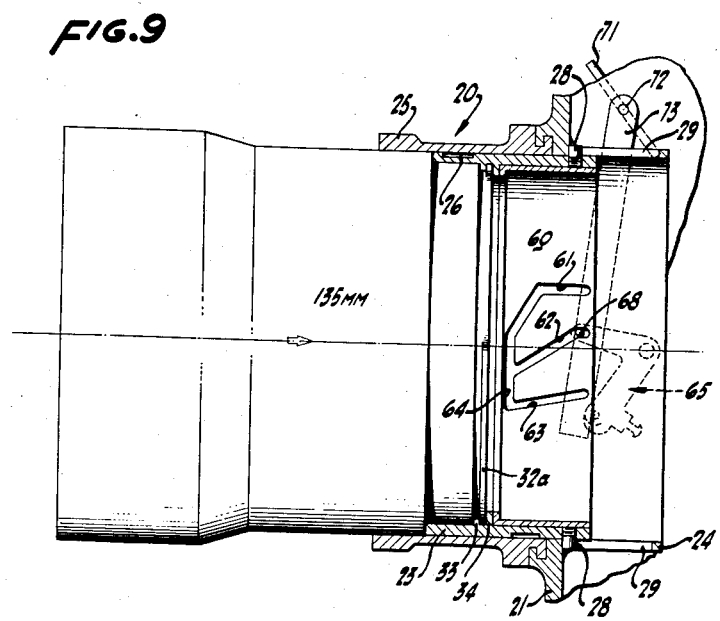
Figure 9 is a sectional view according to Figure 6 showing the position of the range finder coupler elements when the lens mount is focused to its extreme outer position.

The control sleeve 60 is adapted to be automatically set or rotated to position the pin 68 in the neutral slot 64 adjacent the cam slot formed corresponding to the focal length of the lens or optical combination carried by the lens mount being employed with the focusing assembly. As described hereinbefore, the pin 68 is normally positioned, when the tublular member 23 is in its innermost position, in the neutral slot 64 adjacent the cam slot 61, and the light deviating member 71 will be properly coupled for adjustment when the lens mount shown in Figures 2 and 3 carrying a lens or optical combination of 90 mm. focal length is inserted in the focusing assembly and locked to the tubular member 23. In order to properly position the control sleeve 60 when the other lens mounts are employed with the focusing assembly, the control sleeve is provided with a pair of forwardly projecting members 80 and 81 (see Figure 3), which are adapted to extend within the bores of the lens mounts shown in Figures 10 and 11 when such mounts are individually seated within the tubular member 23, and to be engaged by lugs 82 and 83 carried at the inner ends of such mounts, respectively (see Figures 10 and 11), when the mounts are rotated to lock and unlock the same to the tubular member. As will be observed from the arrangement shown in Figures 5 through 8 wherein the lens mount carries a lens or optical combination of 135 mm. focal length, when the mount is seated in the tubular member 23 (Figures 5 and 7) the lug 82 will be positioned between the control sleeve members 80 and 81 adjacent the latter. When the mount is then rotated to engage the end of the arcuate flange 32a against the stop 35 to lock the lens mount to the tubular member, the lug 82 will be rotated to engage the control sleeve member 80 and to rotate the control sleeve 60 to position the pin 68 in the neutral slot 64 adjacent the cam slot 62 (see Figures 6 and 8), such that when the tubular member is then moved through adjustment of the focusing sleeve 25 to focus the camera, the pin 68 will be actuated by the cam slot 62 to effect a movement of the light deviating member 71 of the range finder corresponding to the focal setting of the lens (see Figure 9). When the tubular member is returned to its innermost focusing position and the lens mount rotated in the opposite direction to unlock the same with respect to the tubular member 23, the lug 82 will engage and rotate the control sleeve member 80 to again position the pin 68 in the neutral slot 64 adjacent the cam slot 61 when the lens mount is withdrawn.

By providing each of the lens mounts of Figures 10 and 11 with lugs of a width equal to the rotational movement required to move the control sleeve from its normal position in which the pin 68 is aligned in the neutral slot 64 adjacent to the cam slot 61, to a position in which the pin 68 is aligned adjacent the cam slot formed corresponding to the focal length of the lens carried by such mounts (compare Figures 10 and 11 with Figure 12), the control sleeve 60 will be automatically aligned when the lens mount is seated in and locked to the tubular member 23, and will be returned to a normal position when the lens mount is unlocked and withdrawn from said tubular member.

Such arrangement is additionally particularly adapted for use with lens mounts carrying optical combinations having a shutter mechanism which is adapted in the manner described hereinbefore to be actuated from the camera body since insertion and locking of the lens mount to the tubular member 23 will simultaneously align both the control sleeve 60 and the respective shutter actuating elements shown in Figures 13 and 14.

Although the present invention has been illustrated and described with respect to a specific embodiment thereof wherein three optical combinations having lenses of different focal lengths are to be employed with a focusing assembly of the type described in the pending application for patent Serial Number 390,460, filed November 6, 1953, it will be apparent that the novel features of the invention are adapted for use with any number of interchangeable lens mounts wherein the lenses are adapted for focusing and that many modifications thereof are possible. The invention is not therefore to be restricted except insofar as is necessitated by the prior art and by the spirit of the appended claims.

What is claimed is:

1. In a photographic camera of the type adapted to use interchangeable optical combinations having lens units of different focal lengths carried in lens mounts interchangeable in the camera, the combination with a range finder carried by the camera and including a movable optical element, and a focusing assembly carried by the camera and adapted to removably attach the lens mounts of the interchangeable optical combinations to the camera; of universal coupling means mounted in the camera adapted to transmit focusing movement of the focusing assembly to and adjust the movable optical element of the range finder corresponding to the focal length of the lens unit of the interchangeable optical combination carried in said assembly comprising a rotatable control sleeve carried by the focusing assembly and adapted to be moved therewith during focusing movement of said assembly, a plurality of cam slots in said control sleeve, and a motion-transmitting coupling connection engageable with said cam slots for transmitting movement of said control sleeve during focusing to the movable optical element of the range finder, said cam slots being so formed in said control sleeve as to alter the movement transmitted to the movable optical element for a given movement of said control sleeve in accordance with the focal lengths of the lens units of the optical combinations to be used, and said coupling connection being selectively engageable in said cam slots; and control sleeve setting means adapted to selectively rotate said control sleeve when the lens mount of an optical combination is positioned in the focusing assembly to simultaneously position the coupling connection in the cam slot formed in said sleeve corresponding to the focal length of the optical assembly so positioned.

2. In a photographic camera of the type adapted to use interchangeable optical combinations having lens units of different focal lengths carried in lens mounts interchangeable in the camera, the combination with a range finder carried by the camera and including a movable optical element, and a focusing assembly carried by the camera and adapted to removably attach the lens mounts of the interchangeable optical combinations to the camera; of universal coupling means mounted in the camera adapted to transmit focusing movement of the focusing assembly to and adjust the movable optical element of the range finder corresponding to the focal length of the lens unit of the interchangeable optical combination carried in said assembly, comprising a rotatable control sleeve carried by the focusing assembly and adapted to be moved longitudinally therewith during focusing movement of said assembly, a plurality of circumferentially spaced cam slots in said control sleeve, a motion-transmitting coupling connection having an element engageable with said cam slots and adapted to transmit movement of said control sleeve during focusing to the movable optical element of the range finder, said cam slots being so formed in said control sleeve as to alter the movement transmitted to the movable optical element for a given movement of said control sleeve in accordance with the focal lengths of the lens units of the optical combinations to be used, and a connecting slot in said control sleeve extending transversely to said cam slots and in which said coupling connection element is adapted to ride to selectively position said element for engagement in a cam slot; and means adapted to selectively rotate said control sleeve when the lens mount of an optical combination is positioned in the focusing assembly, to position the coupling connection element in the connecting slot for engagement upon focusing movement of said control ring in the cam slot formed therein corresponding to the focal length of the optical combination carried by the lens mount so positioned.

3. In a photographic camera of the type adapted to use interchangeable optical combinations having lens units of different focal lengths carried in lens mounts interchangeable in the camera, the combination with a range finder carried by the camera and including a movable optical element, and a focusing assembly carried by the camera and adapted to removably attach the lens mounts of the interchangeable optical combinations to the camera; of universal coupling means mounted in the camera adapted to transmit focusing movement of the focusing assembly to and adjust the movable optical element of the range finder corresponding to the focal length of the lens unit of the interchangeable optical combination carried in said assembly, comprising a rotatable control sleeve carried by the focusing assembly and adapted to be moved longitudinally therewith during focusing movement of said assembly, a plurality of mutually extending laterally spaced cam slots in the circumferential wall of said control ring, a circumferential slot in said control sleeve extending transversely to and connecting the outer ends of said cam slots, and a motion-transmitting coupling connection having an element engageable with said cam slots and adapted to transmit longitudinal movement of said control sleeve during focusing to the movable optical element of the range finder, said coupling connection element being operable in said connecting slot when said control sleeve is in its inner position corresponding to the infinite focal setting of the focusing assembly to permit said pin upon determined rotation of said sleeve to be positioned for engagement in a selected cam slot, and said cam slots being so formed in said control sleeve as to alter the movement transmitted to the movable optical element for a given outward movement of said control sleeve in accordance with the focal lengths of the optical combinations to be used; and means carried on the ends of each of the interchangeable lens mounts of the optical combinations adapted to selectively rotate the control sleeve when a lens mount is positioned in the focusing assembly, to position the coupling connection element in the connecting slot for engagement in the cam slot formed in said control sleeve corresponding to the focal length of the lens unit carried by the lens mount so positioned.

4. In a photographic camera of the type adapted to use interchangeable optical combinations having lens units of different focal lengths carried in tubular lens mounts interchangeable in the camera, the combination with a range finder carried by the camera and including a movable optical element, a focusing assembly including a tubular focusing member movable in a longitudinal non-rotational direction within the bores of an inner fixed sleeve member carried in the camera and an outer adjusting sleeve member rotatably secured to said fixed sleeve member, upon rotational movement of said adjusting sleeve member, said tubular member being adapted to carry the interchangeable lens mounts; of universal coupling means mounted in the camera adapted to transmit focusing movement of the focusing assembly to and adjust the movable optical element of the range finder corresponding to the focal length of the lens unit of the interchangeable optical combination carried in said assembly, comprising a rotatable control sleeve carried by the tubular member and adapted to be moved therewith during focusing movement, a plurality of circumferentially spaced cam slots in said control sleeve, a motion-transmitting coupling connection carried by the fixed sleeve having an element engageable with said cam slots and adapted to transmit movement of said control sleeve during focusing to the movable optical element of the range finder, said cam slots being so formed in said control sleeve as to alter the movement transmitted to the movable optical element for a given movement of said control sleeve in accordance with the focal lengths of the lens units of the optical combinations to be used, and a connecting slot in said control sleeve extending transversely to said cam slots and in which said coupling connection element is adapted to ride to selectively position said element for engagement in a cam slot; and means adapted to selectively rotate said control sleeve when the lens mount of an optical combination is positioned in the tubular member, to position the coupling connection element in the connecting slot for engagement upon focusing movement of said control ring in the cam slot formed therein corresponding to the focal length of the optical combination carried by the lens mount so positioned.

5. A photographic camera of the type described adapted to employ optical combinations having lens units of different focal lengths carried in lens mounts interchangeable in the camera comprising, in combination, a range finder carried by the camera having a movable optical element, a focusing assembly carried by the camera and adapted to removably carry the lens mounts of the interchangeable optical combinations to be employed with the camera, and a universal coupling means mounted in the camera adapted to transmit focusing movement of the focusing assembly to and adjust the movable optical element of the range finder corresponding to the focal length of the lens unit of the interchangeable optical combination carried in said assembly, comprising a rotatable control sleeve carried by the focusing assembly and adapted to be moved longitudinally therewith during focusing movement of said assembly, a plurality of circumferentially spaced cam slots in said control sleeve, a motion-transmitting coupling connection having an element engagable with said cam slots and adapted to transmit movement of said control sleeve during focusing to the movable optical element of the range finder, said cam slots being so formed in said control sleeve as to alter the movement transmitted to the movable optical element for a given movement of said control sleeve in accordance with the focal lengths of the lens units of the optical combinations to be used, and a connecting slot in said control sleeve extending transversely to said cam slots and in which said coupling connection element is adapted to ride to selectively position said element for engagement in a cam slot.

6. The photographic camera according to claim 5 including means for automatically rotating the control sleeve when the lens mount of an optical combination is positioned in the focusing assembly, to position the coupling connection element in the connecting slot for engagement upon focusing movement of said control ring in the cam slot formed therein corresponding to the focal length of the optical combination carried by the lens mount so positioned.

7. A photographic camera of the type described adapted to employ optical combinations having lens units of different focal lengths carried in lens mounts interchangeable in the camera comprising, in combination, a range finder carried by the camera having a movable optical element, a focusing assembly including a tubular focusing member movable in a longitudinal non-rotational direction within the bores of an inner fixed sleeve member carried in the camera and an outer adjusting sleeve member rotatably secured to said fixed sleeve member, upon rotational movement of said adjusting sleeve member, said tubular member being adapted to carry the interchangeable lens mounts; a rotatable control sleeve carried by the tubular member and adapted to be moved therewith during focusing movement, a plurality of circumferentially spaced cam slots in said control sleeve, a motion-transmitting coupling connection carried by the fixed sleeve having an element engageable with said cam slots and adapted to transmit movement of said control sleeve during focusing to the movable optical element of the range finder, said cam slots being so formed in said control sleeve as to alter the movement transmitted to the movable optical element for a given movement of said control sleeve in accordance with the focal lengths of the lens units of the optical combinations to be used, a connecting slot in said control sleeve extending transversely to said cam slots and in which said coupling connection element is adapted to ride to selectively position said element for engagement in a cam slot; means for automatically rotating the control sleeve when the lens mount of an optical combination is positioned in the focusing assembly, to position the coupling connection element in the connecting slot for engagement upon focusing movement of said control ring in the cam slot formed therein corresponding to the focal length of the optical combination carried by the lens mount so positioned.

References Cited in the file of this patent

UNITED STATES PATENTS

| | | |
|---|---|---|
| 2,187,246 | Nerwin | Jan. 16, 1940 |
| 2,193,038 | Mihalyi | Mar. 12, 1940 |
| 2,358,121 | Wittel | Sept. 12, 1944 |
| 2,481,677 | McAdam et al. | Sept. 13, 1949 |
| 2,717,543 | McCathron | Sept. 13, 1955 |